Nov. 5, 1957  O. A. JOHNSON ET AL  2,811,781
CHECKING DEVICE

Filed Oct. 17, 1951  3 Sheets-Sheet 1

INVENTORS
OLAF A. JOHNSON
LEONARD O. CARLSEN
BY
Richard W. Treverton
ATTORNEY

Nov. 5, 1957   O. A. JOHNSON ET AL   2,811,781
CHECKING DEVICE
Filed Oct. 17, 1951   3 Sheets-Sheet 2
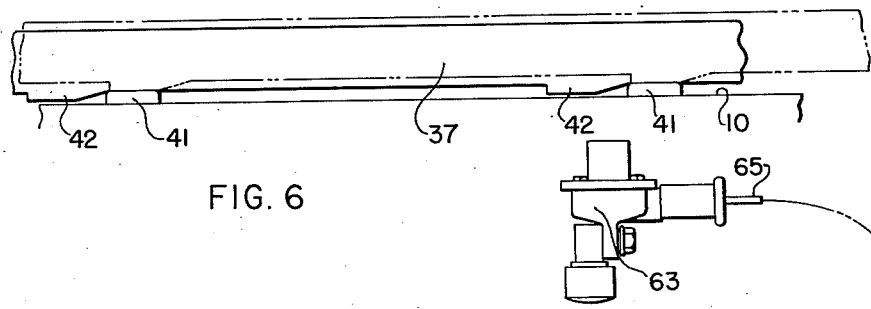
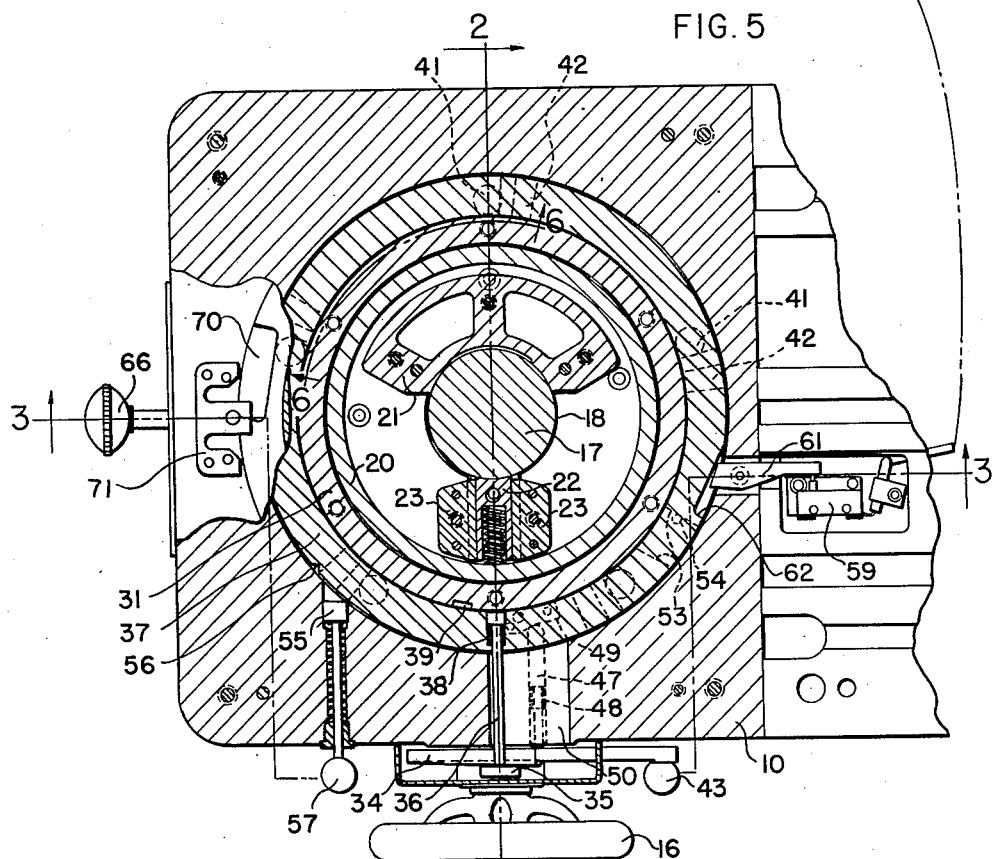
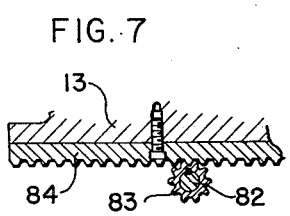
INVENTORS
OLAF A. JOHNSON
LEONARD O. CARLSEN
BY
Richard W. Treverton
ATTORNEY Nov. 5, 1957     O. A. JOHNSON ET AL     2,811,781
CHECKING DEVICE
Filed Oct. 17, 1951     3 Sheets-Sheet 3
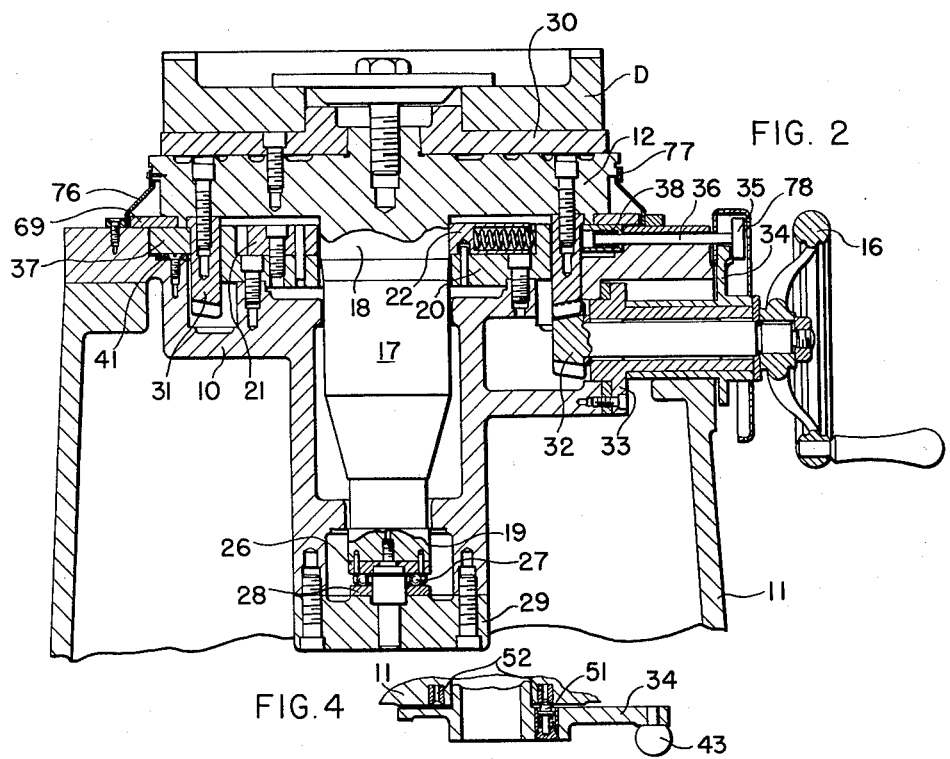
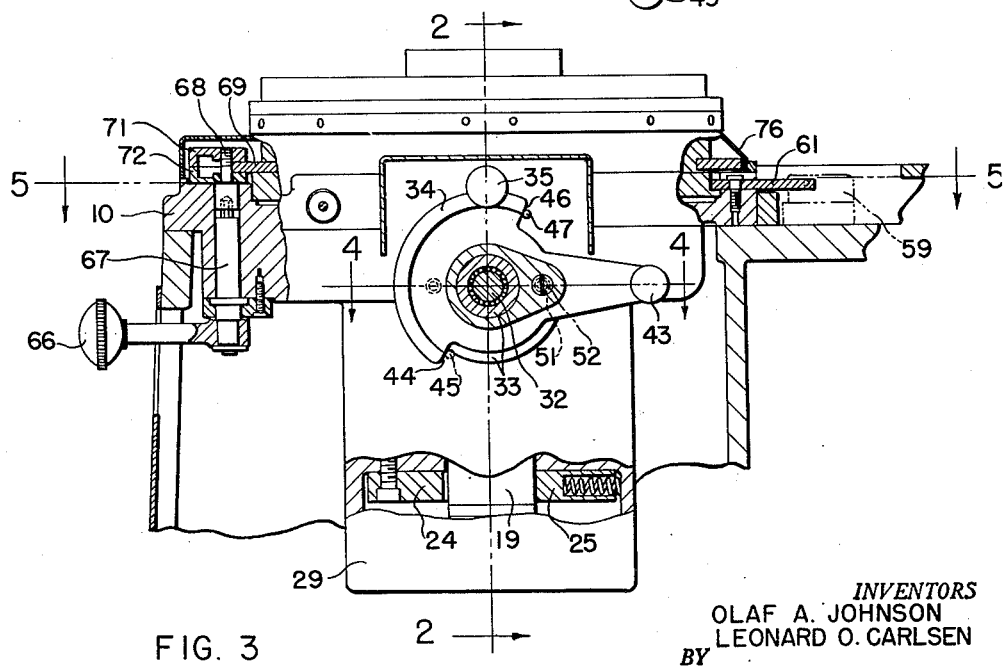
INVENTORS
OLAF A. JOHNSON
LEONARD O. CARLSEN
BY Richard W. Treverton
ATTORNEY United States Patent Office 2,811,781
Patented Nov. 5, 1957

2,811,781

CHECKING DEVICE

Olaf A. Johnson, Irondequoit, and Leonard O. Carlsen, Rochester, N. Y., assignors to The Gleason Works, Rochester, N. Y., a corporation of New York Application October 17, 1951, Serial No. 251,728

11 Claims. (Cl. 33—174)

The present invention relates to a checking device that is suitable for gaging parts, such for example as toothed face clutch members, by rotating them beneath a suitable indicator gage.

According to the invention the rotatable table for supporting the parts is provided with a supporting spindle journaled in radial and axial thrust bearings. The accuracy of the device depends largely upon the perfection of the bearings, and in mounting parts on the table, particularly stacked or nested parts, the thrust bearing is especially vulnerable to damage by forces exerted to bring the parts into firmly seated engagement with each other and with whatever surfaces support them on the table. To effect such engagement the parts are sometimes tapped lightly with a suitable implement, but even light blows may indent and destroy the perfection of the axial thrust bearing surfaces, with the result that the gaging accuracy of the device is impaired.

A primray objective of the present invention, the prevention of such damage to the thrust bearing, is achieved by providing means to lift the spindle off its axial thrust bearing while the test parts are mounted and dismounted. According to the invention a member, hereinafter sometimes called a jack ring, is mounted for rotation on the frame of the device coaxially with the spindle. Coacting cam surfaces are provided on the frame and the jack ring, so that upon partial rotation of the latter, it is shifted slightly in an axial direction to move the spindle off the bearing. The jack ring is so rotated by latching it to the table and then turning the table, this being conveniently accomplished by turning a hand wheel that is connected to the table through reduction gearing. Means are provided to automatically lock the jack ring to the frame in its operative limit position, and, since the table is latched to the jack ring, this lock means also serves to hold the table against rotation while the test parts are being mounted and dismounted. The latch means is released by a manually operable cam; and, to prevent such release while the table is off its axial thrust bearing, an interlock is provided which holds the cam against movement as long as the jack ring is displaced from its idle position.

In order to apprise the operator whether or not the table is supported by its axial thrust bearing, an electric signal lamp and a switch controlling the electric circuit for lamp are provided. The switch is operated by and upon movement of jack ring. An electric vibrator may also be employed to firmly seat the parts being checked; and as a safety precaution, to prevent use of the vibrator when the table is supported on the bearing, the switch is also arranged to control the vibrator's electric circuit.

The indicator gage is supported by a column that is adjustable horizontally on the frame of the device toward and away from the vertical spindle on which the test parts are mounted. By this adjustment test parts of greatly varying diameters may be accommodated. Vertically adjustable on the column is a member which supports, for angular adjustment about a horizontal axis, a crank-shaped horizontal arm on whose outer, eccentric, end the indicator gage is carried. By the combination of vertical adjustment of the member on the column, and the angular adjustment of the crank-shaped arm, test pieces of any height within the range of the device may be accommodated.

The foregoing and other objects and advantages of the invention will appear from the detailed description made in conjunction with the drawings, in which:

Fig. 2 is a vertical sectional view taken along line 2—2 of Figs. 3 and 5;

Fig. 3 is a view partly in side elevation and partly in vertical section in planes at right angles to the plane of Fig. 2;

Fig. 4 is a detail sectional view taken along line 4—4 of Fig. 3;

Fig. 5 is a plan sectional view taken approximately along line 5—5 of Fig. 3;

Fig. 6 is a plane development of a section through the frame of the device, taken approximately along arcuate line 6—6 of Fig. 5; and, Fig. 7 is a detail vertical sectional view of means for adjusting the gage supporting column.

Figure 1:
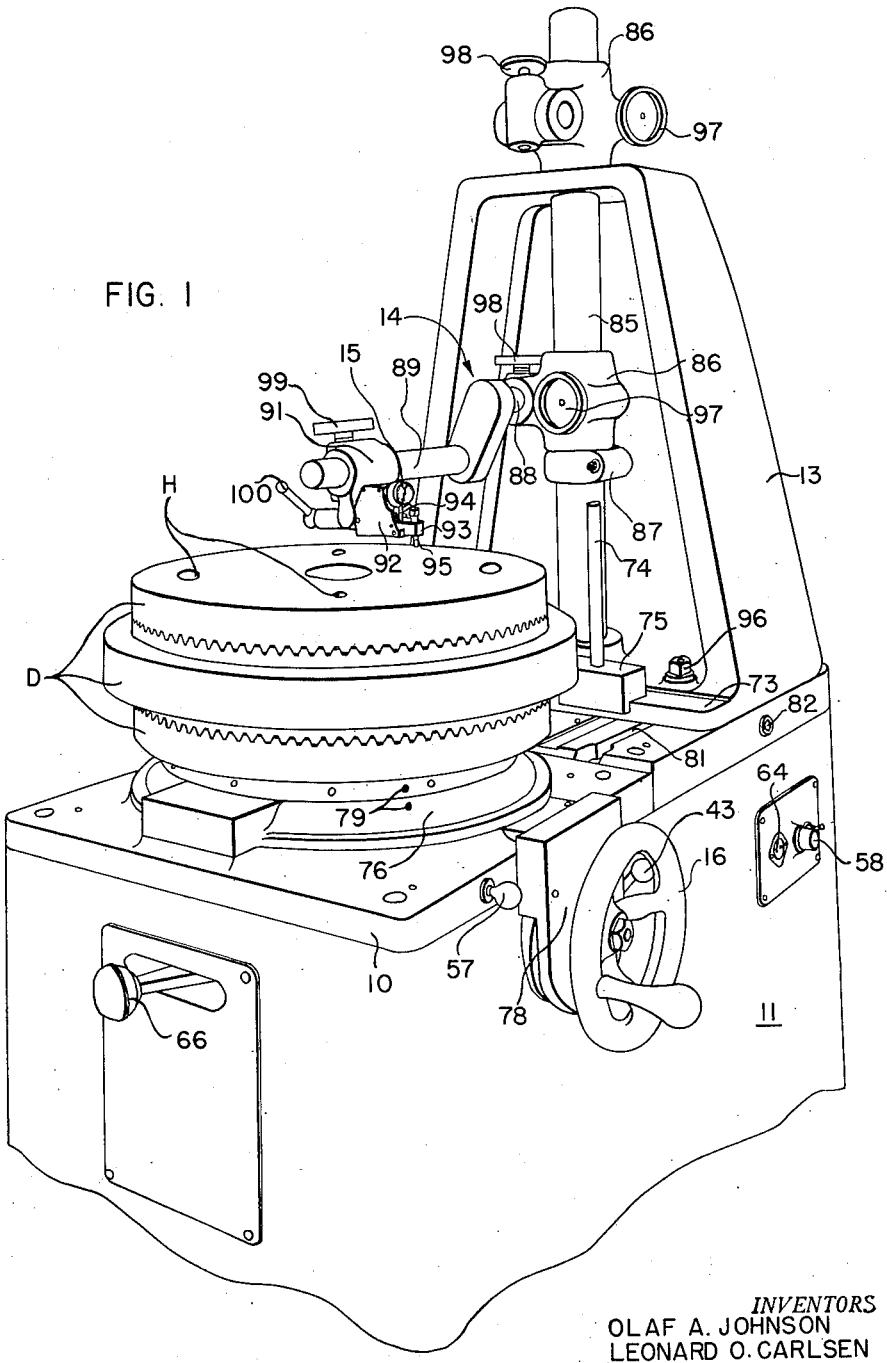
Fig. 1 is a perspective view of the device.

The device includes a two-section frame 10 supported on a pedestal 11, the front section supporting a rotatable table 12 upon which are carried the parts to be checked, in this case face clutch discs D. Adjustable on the rear section of the frame is a column 13 which mounts an adjustable support means 14 for an indicator gage 15 whose actuating bar has an adjustable screw adapted to bear on the parts D during the checking operation. The table 12 may be turned about its upright axis to turn the parts D beneath the gage, by rotation of hand wheel 16. With the gage adjusted as shown in Fig. 1, so that the screw of the gage actuating bar bears on an end face of the uppermost part D, axial runout will be indicated by the gage; but, it will be apparent that when the support means 14 is so adjusted that the screw of the gage bears on the cylindrical peripheral surface of the part, radial runout will be shown.

The rotatable table 12 has an integral spindle 17 having upper and lower journals 18 and 19 mounted in friction bearings. As shown in Figs. 2 and 5 the bearings for journal 18 comprise a stationary bearing 21 secured to a circular plate 20 mounted on frame 10, and further comprise a spring-backed bearing 22 mounted to slide, radially of spindle 17, along guide-ways 23 that are secured rigidly to plate 20. The bearings for journal 19 are similar to but smaller than those for journal 18, and comprise a stationary bearing 24 and a radially slidable spring-backed bearing 25.

Axial support of the spindle 17 is provided by an antifriction thrust bearing comprising upper race 26 secured to the lower end of the spindle, ball bearings 27 retained by a suitable cage, and lower race 28 carried by a cap 29 secured to the frame 10. The faces of races 26 and 28 upon which bearings 27 roll are plane so that the axial thrust bearing will run true irrespective of any slight relative eccentricity which the two races may have. A part D may be secured to the table 12 in concentric relation thereto by means of suitable tooling such, for example, as that shown in Fig. 2 including the face plate 30, whose center fits the bore of the part, the holding disc rested on the upper face of the part and the screw for drawing the disc toward the table 12. Other parts D may then be stacked on the first, the parts being held in alignment by interengagement of their teeth.

Secured to the bottom of table 12 is a ring gear 31 meshing with a shank pinion 32 to which the hand wheel 16 is secured. The shank of the pinion is journaled in needle bearings in a sleeve-like bracket 33 that is secured to the frame 10. Rotatable on the cylindrical outside surface of bracket 33 is the hub of a helical cam 34 upon which rides the head 35 of a latch pin 36. The pin is slidable in a radial bore in the jack ring designated 37, which surrounds the ring gear 31 and is rotatable relative to it and also to the frame 10. A spring 38 surrounds the latch pin and presses against the head at its inner end to urge it into a recess 39 in the ring gear 31 whenever the pin and recess are aligned, and thus latches the jack ring and the gear together for rotation as a unit.

The jack ring is disposed in a recess in frame 10 where it rests upon stationary bearing buttons 41. However when the pin 36 is engaged in recess 39 and the hand wheel 16 is turned, clockwise in Fig. 1, the cam lobes 42 on the bottom of the jack ring ride up on the buttons, to the position shown in broken lines in Fig. 6, and elevate the ring and the table 12, thereby lifting the thrust bearing race 26 off the ball thrust bearing 27. Reverse rotation of the hand wheel will, of course, return these parts to their normal position. In this normal position the latch pin 36 may be withdrawn from recess 39 by rotating helical cam 34 by means of its knob 43 in a counter-clockwise direction as viewed in Figs. 1 and 3 until its shoulder 44 engages a stop pin 45 which protrudes from the pedestal 11.

In order to lock the cam 34 in its opposite limit position (wherein a shoulder 46 of the cam engages stop pin 45) at all times when the jackring 37 is displaced from its normal position, a locking pin 47 engageable with shoulder 44 is provided. The pin is slidable in a bore in the frame and is normally held retracted therein, out of the path of shoulder 44, by a spring 48. A cam 49 carried by the jack ring abuts the inner end of the pin, and upon initial motion of the jack ring from its normal position (counter-clockwise in Fig. 5), shifts the pin outwardly into the path of shoulder 44. Accordingly the cam 34 is locked against motion, with its shoulders 44 and 46 respectively held by pins 47 and 45, until the jack ring is returned to its normal position.

In order to prevent unintentional motion of cam 34 from either of its limit positions when it is unlocked, it is provided with a spring-backed plunger 51 (Fig. 4) engageable in either of two detents 52 set in the member 11. The plunger is designed to cam out of engagement with either detent upon application of any substantial manual pressure upon knob 43.

The rotation of the jack ring is limited to an amount sufficient to allow the co-action between bearing buttons 41 and cam lobes 42 that has been described hereinbefore. To this end a slot having side walls 53 (Fig. 5) is provided in the bottom of the ring, and a pin 54 extends from the frame into this slot and by abutment with the walls 53 limits the rotation of the ring. For locking the ring in its operative position (wherein the lowermost wall 53 in Fig. 5 abuts pin 54) a spring-backed plunger 55 is arranged to slide in a bore in the frame into engagement in a notch 56 in the ring. The plunger drops into this notch whenever the jack ring reaches its limit operative position and the operator can release it only by pulling outwardly on its knob 57. As shown in Fig. 5 the frame 10 has a slot 50 through which the latch pin 36 extends, the slot being wide enough to permit the pin to turn with the jack ring through the angle allowed by stop means 53, 54.

For the purpose of indicating to the machine operator that the spindle is off its axial thrust bearing and that the table is locked against rotation, a signal lamp 58 (Fig. 1) is provided. The electric circuit for the lamp is controlled by a normally open limit switch 59 (Fig. 5) which is closed, to cause the lamp to light, by a pivoted lever 61 being swung in a clockwise direction by an abutment 62 on the jack ring 37 as the latter approaches its operative limit position. When the jack ring departs from this limit position the switch is opened by a spring, not shown, that is included in the switch structure. This switch also controls the circuit for an electric vibrator 63 which may be employed to firmly seat parts D upon each other. To this end a socket 64 (Fig. 1) may be electrically connected in parallel with the lamp 58, and is adapted to receive a plug on the end of an electric cable 65 extending from the vibrator 63. With this arrangement the operator is unable to operate the vibrator except at times when the table 12 is elevated off thrust bearing 27 and is locked against rotation by plunger 55, the condition indicated by the lamp 58 being lighted.

For holding the table against rotation at other times, when the means 55, 56 and 53, 54 are ineffective, a clamping means actuated by hand lever 66 is provided. The shaft for the lever, designated 67, is rotatable in the frame and has a telescoping connection with a screw 68 for transmitting rotation to the latter. A clamp ring 69 is secured to the table 12, and engageable with it are upper and lower clamp shoes 71 and 72. The screw 68 is threaded into the shoe 71 but is freely rotatable in a bore through shoe 72. Consequently partial rotation of the screw by means of hand lever 66 is effective to draw the shoes together, thereby clamping the ring 69 and holding the table against rotation. The telescoping connection between shaft 67 and screw 68 prevents the transmission to the spindle bearings of any loads resulting from the clamp shoes 71 and 72 closing upon the clamp ring 69. In order to prevent the clamp ring 69 from abutting the upper shoe 71 when the table 12 is raised, the upper surface of the ring is slightly recessed at 70, by an amount greater than that by which the table is raised. The recess is so located and is of such width as to be abreast of the clamp shoes throughout the range of movement of the table 12 when the latter is latched to jack ring 31.

A guard ring 76 mounted on the frame 10 cooperates with a ring 77 on the periphery of table 12 to bar entrance of foreign matter into the interior of the device. A guard 78 extending over cam 34 and head 35 of latch pin 36 prevents improper manual release of the pin.

The column 13 is adjustable along ways 81 on the rear section of frame 10, in order to accommodate parts D of different diameters. Such adjustment is effected by turning with a wrench a shaft 82 that carries a pinion 83, the pinion meshing with a rack 84 provided on the column as is shown in Fig. 7. The gage supporting means, indicated generally at 14, includes an upright rod 85 stationary on the column, upper and lower clamping sockets 86 that are vertically slidable and also rotatable on the rod 85, and a collar 87 also adjustable vertically along rod 85. Adapted to fit into the horizontal bore of either socket is end portion 88 of a crank shaped horizontal arm whose eccentric outer end 89 carries a clamping socket 91 that in turn supports a gage head 92 upon which gage 15 is mounted. The socket 91 is adjustable about and also along the end portion 89 of the horizontal bar and the head 92 is adjustable upon the socket about an axis perpendicular to arm portion 89. Mounted for movement on the gage head by means of parallel leaf springs (not shown) is the actuating bar 93 which engages the actuating stem 94 of gage 15 and carries the adjusting screw 95 that engages a part D.

One way of adjusting the gage is to first move the column 13 fore or aft along ways 81 by turning shaft 82, and then lock it in adjusted position by tightening nuts 96 which are threaded to bolts, not shown, which secure the column to the frame 10. The horizontal arm 88, 89 is then inserted in one of the sockets, which one depending upon the height of the particular parts D that are to be checked. The selected socket 86 is then adjusted to the desired position angularly and vertically on rod 85 and secured in this position by tightening a clamping screw 97. The arm 88, 89 is then turned in socket 86 to more accurately adjust the height of its end portion 89, and is then secured in the selected position by tightening clamping screw 98. As shown in the drawings the relative eccentricity of the two end parts of arm 88, 89 is greater than the center-to-center distance of upper and lower sockets when respectively in their lower and upper positions. Consequently the only limitation of the adjusted height of part 89 is the overall length of rod 85. Socket 91 is adjusted angularly and axially along arm part 89 and secured by means of clamping screw 99. Next the gage head 92 is adjusted angularly on socket 91 so that the screw 95 extends in the desired direction (usually perpendicular) to whatever surface of part D it is to contact and is clamped in this position by a screw-threaded means which includes lever 100. Finally the screw 95 is adjusted into proper contact to the part D.

In order to swing or raise the horizontal arm 88, 89 to an out-of-the-way position in order to provide clearance to mount and dismount successive test parts D, without losing the vertical adjustment of the gage, the collar 87 may be raised on rod 85 into abutment with the bottom of socket 86 and clamped to the rod 85 in this position. The screw 97 may then be loosened and the arm 88, 89 and the socket 86 swung as a unit about the rod 85, or raised along it, or both. When after replacement of parts D, the arm and socket are returned to their original position, resting on the collar 87, their vertical position will be the same as before.

The operation of the device will be understood from the foregoing description, but, to summarize, a typical example will now be given. Assume that the three nested parts D shown in Fig. 1 are to be checked for axial and radial runout. Before placing them on the device, the operator first moves lever 66 to release the clamp shoes 71, 72 from clamp ring 69, so that the table 12 is free to turn. He then moves knob 43 to turn cam 34 clockwise (in Fig. 1) to its limit position wherein shoulder 46 engages stop pin 45, thereby freeing pin 36 for inward movement. The hand wheel 16 is now turned, in either direction, until pin 36 drops into recess 39, thus latching the jack ring to the ring gear 31. To facilitate this operation a pair of buttons 79 are provided on the guard rings 76 and 77. When these buttons are aligned, the table is in the position wherein pin 36 is aligned with recess 39. He next turns the hand wheel (clockwise in Fig. 1) rotating the table and jack ring as a unit in a counter-clockwise direction (Fig. 5) to its limit operative position wherein pin 55 drops into recess 56 on ring 37. During this movement the jack ring lifts the table off its spindle thrust bearing and the cam 49 moves the locking pin 47 outwardly, thereby locking the cam 34 against movement. Also the lamp 58 is lighted and the socket 64 energized. The operator now installs the lowermost part D on the table as shown in Fig. 2, and stacks the other parts D on it, holding the anvil of the now energized vibrator 63 against the uppermost part, if desired, to aid in bringing them into fully nested relationship. Next he pulls out the knob 57 and simultaneously turns the hand wheel 16 counter-clockwise until the jack ring is arrested in its idle limit position shown in Fig. 5 wherein buttons 79 (Fig. 1) are aligned. During this motion the spindle will seat by gravity, on its thrust bearing, and also the lamp 58 will be extinguished and the pin 47 retracted. The knob 43 is now moved to turn cam 34 counter-clockwise to bring its shoulder 44 into abutment with pin 45, thereby retracting pin 36 from recess 39 and freeing the table for rotation independently of the jack ring. The support 14 may now be adjusted to bring the gage 15 into the position shown with relation to the uppermost part D. Now by turning the table by means of the hand wheel, the parts D may be turned beneath the gage and readings taken of their axial runout in various positions. After the desired checking has been completed the table may again be elevated and locked by operation of the jack ring and plunger 55, as previously described, prior to removal of the parts D from the table.

The testing or inspecting performed on the machine may include determination of the alignment of holes H in the parts D with relation to their clutch teeth. For this and other purposes the base of column 13 is provided with a straight way 73 that serves as a reference line or surface from which measurements may be taken and checks made, as for example from an indicator gage mounted on a rod 74 supported by a tramming bar 75 that rests upon the way 73. For the purpose of making such a check, or for other purposes, it may also be desired to clamp the table in a particular position of rotation, and this may be done, as hereinbefore explained, by actuating the clamp lever 66.

It will be understood that the foregoing disclosure is made by way of illustration of the inventive principles involved, and that these may be embodied in other physical forms and arrangements without departing from the spirit of the invention or from the scope of the appended claims.

What is claimed is:

1. In a checking device, a frame, a spindle mounted for rotation on the frame on radial and axial thrust bearings, means for rotating the spindle relative to the frame, and means for simultaneously moving the spindle axially away from the axial thrust bearing and securing the spindle against rotation.

2. In a checking device according to claim 1, an indicator for showing when the spindle is away from the axial thrust bearing and the spindle is secured against rotation.

3. In a checking device, a frame, a spindle mounted for rotation on the frame on radial and axial thrust bearings, means for moving the spindle axially away from the axial thrust bearing, a power operated mechanism for tapping test pieces while they are on the spindle, and means for rendering said mechanism inoperative when the spindle is engaged with the thrust bearing.

4. In a checking device, a frame, a table having a spindle mounted for rotation on the frame on radial and axial thrust bearings, a jack member mounted for partial rotation on the frame coaxially with the spindle, said member acting between the frame and the table upon such rotation to move the table axially and thereby shift the spindle away from the axial thrust bearing, and means to connect the member to the table for rotation therewith.

5. In a checking device according to claim 4, an electric switch operable by and upon such partial rotation of the jack member, and an electrically operated signal controlled by the switch.

6. In a checking device according to claim 4, manually releasable means for automatically locking the jack member in the position thereof in which the spindle is away from the axial thrust bearing.

7. In a checking device according to claim 4, in which the means there last-mentioned is a manually releasable latch means and there is a means, operable concomitantly with displacement of the jack member from its idle position, for locking the latch means against release.

8. In a checking device, a frame, a table having an upright spindle rotatable in radial and axial thrust bearings on the frame, a jack ring movable upon the frame substantially about the axis of the spindle, the ring and frame having coacting surfaces for lifting the ring upon such partial rotation from the idle position of the ring, the ring when lifted coacting with the table to lift the latter and thereby raise the spindle off said axial thrust bearing, and means to latch the ring to the table for partial rotation therewith.

9. In a checking device according to claim 8, the latch means being manually releasable and there being means operable concomitantly with movement of the ring from its idle position for locking the latch means against manual release.

10. In a checking device according to claim 9, a manually rotatable cam engageable with the latch means for withdrawing it from its operative position.

11. In a checking device according to claim 9, having a manually-operable member rotatable about an axis angularly related to the spindle axis and having a driving connection with the table for rotating the latter, the cam being rotatable coaxially of the manually operable member, and the means for locking the latch means comprising a stop projected into the path of the cam by and upon rotation of the ring from its idle position.

References Cited in the file of this patent

UNITED STATES PATENTS

| | | |
|---|---|---|
| 1,367,579 | Ziegler | Feb. 8, 1921 |
| 1,572,476 | Galloway | Feb. 9, 1926 |
| 1,670,772 | Jones | May 22, 1928 |
| 2,220,404 | Hulslander | Nov. 5, 1940 |
| 2,398,171 | Zimmermann | Apr. 9, 1946 |
| 2,429,923 | Cavicchi | Oct. 28, 1947 |
| 2,482,051 | Yingling | Sept. 13, 1949 |
| 2,524,538 | Pearson | Oct. 3, 1950 |